(12) United States Patent
Jang et al.

(10) Patent No.: US 8,851,525 B2
(45) Date of Patent: Oct. 7, 2014

(54) AIR INTAKE HOSE FOR A VEHICLE

(75) Inventors: Young Hak Jang, Seoul (KR); Je Hui Jun, Suwon-si (KR); Jinwoong Shin, Daejeon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 53 days.

(21) Appl. No.: 13/559,176

(22) Filed: Jul. 26, 2012

(65) Prior Publication Data

US 2013/0146170 A1    Jun. 13, 2013

(30) Foreign Application Priority Data

Dec. 7, 2011    (KR) ........................ 10-2011-0130579

(51) Int. Cl.
*F16L 13/00*    (2006.01)

(52) U.S. Cl.
USPC ..................................... 285/286.1; 285/285.1

(58) Field of Classification Search
USPC ................ 285/285.1, 131.1, 132.1, 226, 227, 285/286.1
See application file for complete search history.

(56) References Cited

U.S. PATENT DOCUMENTS

| | | | | |
|---|---|---|---|---|
| 4,997,213 A | * | 3/1991 | Traner et al. | 285/131.1 |
| 5,447,341 A | * | 9/1995 | Hartel et al. | 285/238 |
| 5,568,944 A | * | 10/1996 | Kawasaki | 285/21.1 |
| 5,723,828 A | * | 3/1998 | Nakagawa | 181/250 |
| 6,041,824 A | * | 3/2000 | Powell | 138/109 |
| 6,182,326 B1 | * | 2/2001 | Rhea et al. | 15/314 |
| 6,755,217 B1 | * | 6/2004 | Yoshida et al. | 138/121 |
| 6,832,785 B1 | * | 12/2004 | Zitkovic, Jr. | 285/21.1 |
| 6,838,041 B2 | * | 1/2005 | Rowley | 264/506 |
| 8,424,923 B2 | * | 4/2013 | Inman et al. | 285/285.1 |
| 2003/0155694 A1 | * | 8/2003 | Rowley | 264/506 |
| 2005/0031475 A1 | * | 2/2005 | Taniguchi | 417/472 |
| 2005/0035592 A1 | * | 2/2005 | Williams | 285/125.1 |
| 2005/0062282 A1 | * | 3/2005 | Rosch et al. | 285/21.1 |
| 2007/0222213 A1 | * | 9/2007 | Andersen | 285/285.1 |
| 2008/0143102 A1 | * | 6/2008 | Graybeal | 285/131.1 |
| 2013/0043676 A1 | * | 2/2013 | Baker | 285/286.1 |
| 2013/0140811 A1 | * | 6/2013 | Fahrer et al. | 285/285.1 |
| 2013/0153046 A1 | * | 6/2013 | Hansom et al. | 137/15.01 |

FOREIGN PATENT DOCUMENTS

| | | |
|---|---|---|
| JP | 10-502881 A | 3/1998 |
| JP | 2902364 B2 | 3/1999 |
| JP | 2004-315619 A | 11/2004 |
| JP | 3787915 B2 | 4/2006 |

* cited by examiner

*Primary Examiner* — Aaron Dunwoody
(74) *Attorney, Agent, or Firm* — Morgan, Lewis & Bockius LLP

(57) ABSTRACT

An air intake hose for a vehicle may include a blow molding portion formed in a hollow hose shape by blow molding, an injection molding portion formed in a hollow hose shape by injection molding, and a coupling portion formed at one end of the blow molding portion, wherein the blow molding portion and the injection molding portion may be coupled with each other by injecting a material forming the injection molding portion into an injection mold in a state in which the coupling portion may be inserted in the injection mold.

10 Claims, 4 Drawing Sheets

AIR INTAKE HOSE FOR A VEHICLE

CROSS-REFERENCE TO RELATED APPLICATION

The present application claims priority to Korean Patent Application No. 10-2011-0130579 filed in the Korean Intellectual Property Office on Dec. 7, 2011, the entire contents of which is incorporated herein for all purposes by this reference.

BACKGROUND OF THE INVENTION

1. Field of the Invention

The present invention relates to an air intake hose for a vehicle and a production method thereof. More particularly, the present invention relates to an air intake hose for a vehicle and a production method thereof that is integrally formed by injection molding.

2. Description of Related Art

Generally, fuel and air are needed for operating an engine of a vehicle. In addition, an engine receives required new cool air from outside of a vehicle through an intake system.

The intake system filters foreign materials like dust and sand of air flowed from the outside of the vehicle. In addition, an air intake hose connecting an air filter and an engine is applied to the intake system so as to reduce vibration induced by operation of an engine.

The air intake hose applied to the intake system of an engine is made from a mixture of rubber, a thermoplastic elastomer (TPE), polypropylene (PP) and so on. Among the materials, TPE is lighter than rubber and has a merit of excellent durability.

Meanwhile, the air intake hose may be formed by coupling two portions of which one portion is made by injection molding and the other portion is made by blow molding.

The injection molding is a method of forming the air intake hose by injecting melted materials into an injection mold with an injection machine. In addition, the air intake hose and the injection mold are separated after the injection molding is completed.

The injection mold includes an upper mold and a lower mold that are coupled with each other so as to form a cavity corresponding to an external shape of the air intake hose, and is further includes a main core disposed apart from the upper mold and the lower mold in the cavity so as to form an internal shape of the air intake hose.

Blow molding is a method to make hollow products by blowing melted materials by air after the melted materials are inserted into a mold.

Meanwhile, the one portion formed by the injection molding and the other portion formed by the blow molding are coupled by using a clamp or fusion in which the coupling portion is fused by heat or ultrasonic wave.

However, the coupling methods may increase the cost of the air intake hose. In addition, aesthetical features of the air intake hose may be deteriorated if the clamp is used. Further, in the case of fusing by heat or ultrasonic waves, the coupling force may become weak according to each polarity of the materials respectively used for the injection molding and the blow molding.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an air intake hose for a vehicle and a production method thereof having advantages of having a strong coupling force between one portion formed by injection molding and another portion formed by blow molding even though aesthetical features are improved.

In addition, various aspects of the present invention are directed to providing an air intake hose for a vehicle and a production method thereof having advantages of simplifying the production process and reducing the production cost.

In an aspect of the present invention, an air intake hose for a vehicle may include a blow molding portion formed in a hollow hose shape by blow molding, an injection molding portion formed in a hollow hose shape by injection molding, and a coupling portion formed at one end of the blow molding portion, wherein the blow molding portion and the injection molding portion are coupled with each other by injecting a material forming the injection molding portion into an injection mold in a state in which the coupling portion is inserted in the injection mold.

Bellows are formed at a part of the injection molding portion along a length direction thereof.

The injection molding portion is coupled with the blow molding portion so as to form an extended shape of the blow molding portion.

The coupling portion is inserted into the injection molding portion such that an exterior circumference of the coupling portion contacts an interior circumference of the injection molding portion.

A coupled surface is formed at an end of the coupling portion, and

An injection coupling portion coupled with the coupled surface is formed at the injection molding portion.

A plurality of protrusions is protruded from the coupled surface, and one surface of the injection coupling portion coupled with the coupled surface is formed corresponding to a shape of the coupled surface.

The protrusions are gradually widened along a protruding direction.

Materials of the blow molding portion and the injection molding portion are thermoplastics having the same polarity.

The material of the blow molding portion is polypropylene.

The material of the blow molding portion is nylon.

The material of the injection molding portion is a thermoplastic elastomer.

The injection molding portion may include first, second, and third injection molding portions, and the blow molding portion may include first, second and third pipes, wherein the second and third pipes are bifurcated from the first pipe to form a Y shape, and wherein the first injection molding portion is coupled to an end of the first pipe, the second injection molding portion is coupled to an end of the second pipe, and the third injection molding portion is coupled to an end of the third pipe.

First, second and third bellows are formed at a part of the first, second and third injection molding portion respectively.

In another aspect of the present invention, a method of manufacturing an air intake hose for a vehicle, the air intake hose having a blow molding portion formed in a hollow hose shape by blow molding and an injection molding portion formed in a hollow hose shape by injection molding, may include preparing materials of the blow and injection molding portions and an injection mold used for the injection molding, forming the blow molding portion, inserting a part of the blow molding portion into the injection mold through one end of the injection mold, injecting the material of the injection molding portion into the injection mold through the other end of the injection mold, and separating and removing the injection mold.

The blow molding portion inserted into the injection mold is coupled with the material of the injection molding portion injected into the injection mold such that the blow molding portion and the injection molding portion are integrally formed with each other.

A plurality of protrusions is protruded from a coupled surface of the blow molding portion coupled with the material of the injection molding portion.

The protrusions are gradually widened along a protruding direction.

The material of the injection molding portion is injected between the protrusions so as to obtain a strong coupling force.

Thermoplastic materials having the same polarity are used for forming the blow molding portion and the injection molding portion.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
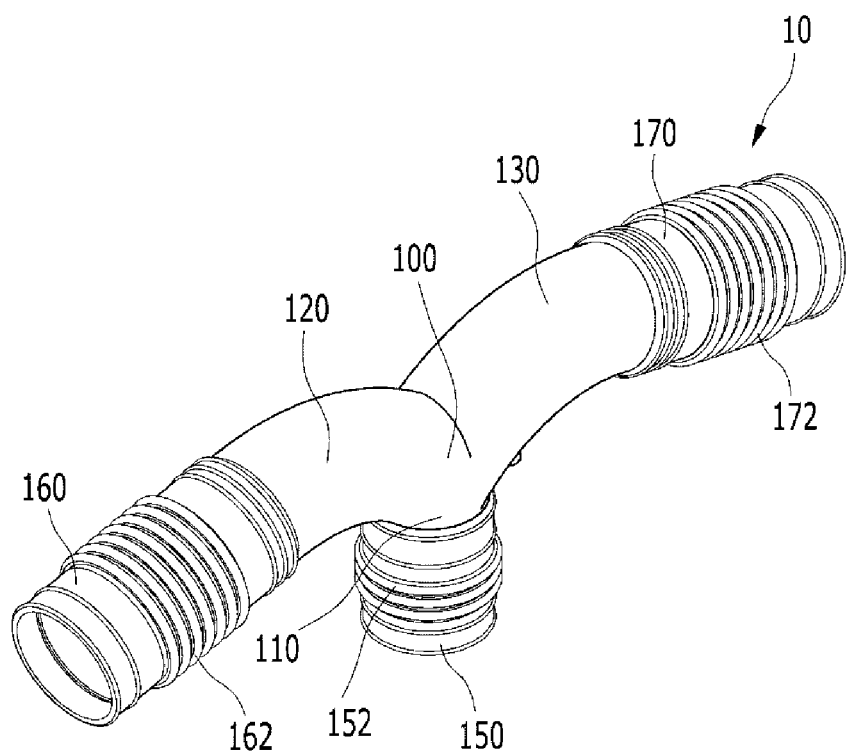
FIG. 1 is a perspective view of an air intake hose for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

FIG. 1 is a perspective view of an air intake hose for a vehicle according to an exemplary embodiment of the present invention.

As shown in FIG. 1, an air intake hose 10 includes a blow molding portion 100 and injection molding portions 150, 160, and 170.

The blow molding portion 100 is formed in a shape such that one pipe is divided to two separate pipes. In other words, the blow molding portion 100 includes a first pipe 110, a second pipe 120, and a third pipe 130, and the second pipe 120 and the third pipe 130 are divided from the first pipe 110. Therefore, the blow molding portion 100 is a three-way hose formed in a shape of a "Y". Meanwhile, the shape of the blow molding portion 100 can be changed by a person of ordinary skill in the art such that performance of the air intake hose 10 is improved.

Meanwhile, the blow molding portion 100 is formed of a material made by synthesis of polypropylene (PP) and talc or a material made by synthesis of nylon and glass fiber.

The injection molding portions 150, 160, and 170 are hoses for coupling with the blow molding portion 100, and includes a first injection molding portion 150, a second injection molding portion 160 and a third injection molding portion 170.

The first injection molding portion 150 is coupled with the blow molding portion 100 so as to be extended from the first pipe 110. In addition, a first bellows 152 is formed at a part of the first injection molding portion 150 along its length direction. Herein, the bellows is a continuously folding shape of the hose for improving stretching. In other words, the air intake hose 10 having the first bellows 152 can reduce vibration noise induced by operation of an engine.

The second injection molding portion 160 is coupled with the blow molding portion 100 so as to be extended from the second pipe 120. In addition, a second bellows 162 is formed at a part of the second injection molding portion 160 along its length direction.

The third injection molding portion 170 is coupled with the blow molding portion 100 so as to be extended from the third pipe 130. In addition, a third bellows 172 is formed at a part of the third injection molding portion 170 along its length direction.

The shapes and functions of the second bellows 162 and the third bellows 172 are almost same as the first bellows 152, and the first, second, and third bellows 152, 162, and 172 may be formed to have different shapes by a person of ordinary skill in the art.

Meanwhile, the injection molding portions 150, 160, and 170 may be formed of a thermoplastic elastomer (TPE). In addition, the TPE is formed to have the same polarity as the blow molding portion 100 according to the material of the blow molding portion 100 selectively using a synthesis material of PP and talc having no polarity or a synthesis material of nylon and glass fiber having polarity.

The air intake hose 10 according to an exemplary embodiment of the present invention is formed of the thermoplastic materials like PP and TPE so as to reduce vibration and decrease weight.

Figure 2:
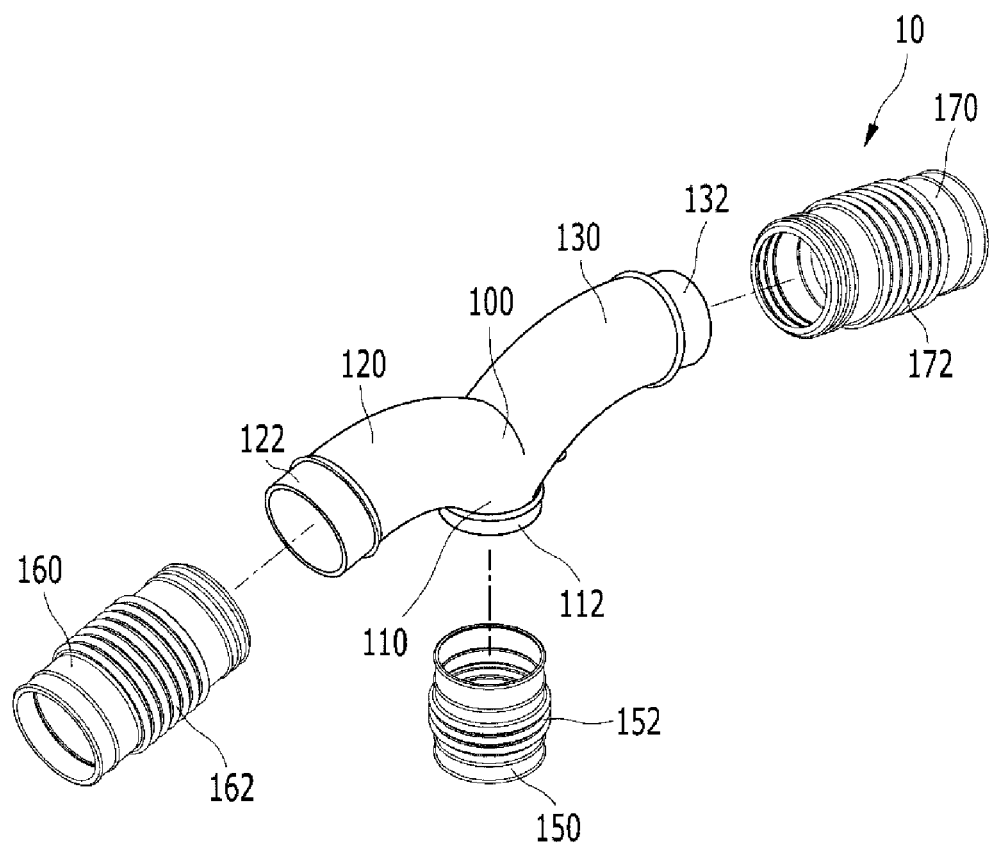
FIG. 2 is an exploded view of an air intake hose for a vehicle according to an exemplary embodiment of the present invention.

FIG. 2 is an exploded view of an air intake hose for a vehicle according to an exemplary embodiment of the present invention.

As shown in FIG. 2, the blow molding portion 100 further includes a first coupling portion 112, a second coupling portion 122 and a third coupling portion 132.

The first coupling portion 112 is formed at an end of the first pipe 110 coupled with the first injection molding portion 150. In addition, the first pipe 110 and the first injection molding portion 150 are coupled with each other by inserting the first coupling portion 112 into one end of the first injection molding portion 150.

The second coupling portion 122 is formed at an end of the second pipe 120 coupled with the second injection molding portion 160. In addition, the second pipe 120 and the second injection molding portion 160 are coupled with each other by inserting the second coupling portion 122 into one end of the second injection molding portion 160.

The third coupling portion 132 is formed at an end of the third pipe 130 coupled with the third injection molding portion 170. In addition, the third pipe 130 and the third injection molding portion 170 are coupled with each other by inserting the third coupling portion 132 into one end of the third injection molding portion 170.

The shapes and functions of the first coupling portion 112, the second coupling portion 122, and the third coupling portion 132 are almost the same, and the first, second and third coupling portions 112, 122, and 132 may be formed to have different shapes by a person of ordinary skill in the art.

Figure 3:
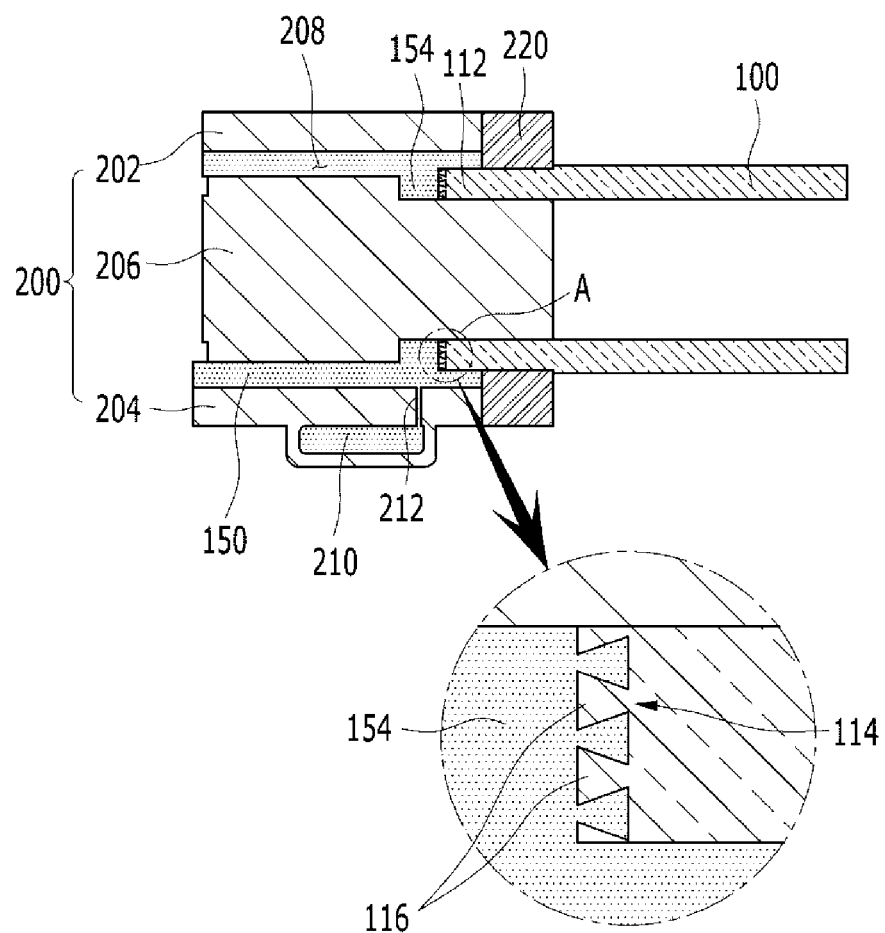
FIG. 3 is a cross-sectional view of an air intake hose for a vehicle and an injection mold according to an exemplary embodiment of the present invention.

FIG. 3 is a cross-sectional view of an air intake hose for a vehicle and an injection mold according to an exemplary embodiment of the present invention. In addition, FIG. 3 shows that the blow molding portion 100 and the injection molding portions 150, 160, and 170 are coupled with each other by the injection molding of the injection molding portions 150, 160, and 170 in an injection mold 200. Meanwhile, even though only coupling of the first injection molding portion 150 and the first coupling portion 112 is shown in FIG. 3, respectively coupling the second and third injection molding portions 160 and 170 and the second and third coupling portions 122 and 132 are the same as shown in FIG. 3.

As shown in FIG. 3, the injection mold 200 includes an upper mold 202, a lower mold 204, a core 206, a sliding member 220, a chamber 210 and connecting passage 212.

A cavity of the injection mold 200 is formed by coupling the upper mold 202 and the lower mold 204. In addition, interior surfaces of the upper mold 202 and the lower mold 204 are formed in shapes respectively corresponding to exterior circumferences of the injection molding portions 150, 160, and 170.

The core 206 is disposed apart from the upper mold 202 and the lower mold 204 in the cavity. In other words, the upper mold 202 and the lower mold 204 are respectively disposed apart from the core 206 so as to form an injection space 208 in the cavity. In addition, the exterior surface of the core 206 is formed in a shape respectively corresponding to interior circumferences of the injection molding portions 150, 160, and 170.

The sliding member 220 is mounted on one end of the length direction of the injection mold 200. In addition, the blow molding portion 100 is inserted into the injection space 208 through the one end of length direction of the injection mold 200. Herein, the sliding member 220 is provided for easily inserting the blow molding portion 100.

The materials of the injection molding portions 150, 160, and 170 are injected into the injection space 208 through the other end of length direction of the injection mold 200. In addition, the injection molding portions 150, 160, and 170 are formed according to the shape of the injection space 208, and the coupling portions 112, 122, and 132 of the blow molding portion 100 are inserted into the injection space 208 so as to respectively couple the injection molding portions 150, 160, and 170.

The chamber 210 is a space formed at the exterior circumference of the lower mold 204. In other words, a partial exterior circumference of the lower mold 204 protrudes so as to form the chamber 210. In addition, the connecting passage 212 communicates the injection space 208 with the chamber 210. In other words, the materials (TPE) of the injection molding portion 150, 160, and 170 are flowed into the chamber 210 after filling the injection space 208 when the materials (TPE) are injected into the injection space 208.

Therefore, a void being generated by gas occurring in the injection molding can be prevented, and completeness of the molding can be maximized. In addition, faulty production of the injection molding portions 150, 160, and 170 can be prevented even if an error occurs in measuring the material (TPE) since an amount of material (TPE) is determined by considering the volume of the chamber 210.

FIG. 3 shows an enlarged view of the "A" where the coupling portions 112, 122, and 132 and the injection molding portions 150, 160, and 170 are respectively coupled with each other.

As shown in the enlarged view of the "A" portion, the injection molding portions 150, 160, and 170 are coupled with the coupling portions 112, 122, and 132 by covering the exterior circumference of the coupling portions 112, 122, and 132. That is, a coupled surface 114 is formed at the coupling portions 112, 122, and 132 and is as long as the length of the coupling portions 112, 122, and 132.

The coupled surface 114 forms a plurality of protrusions 116, and the protrusions 116 are gradually widened along the protruding direction. Meanwhile, the shape of the coupled surface 114 can be changed by a person of ordinary skill in the art so as to obtain a strong coupling force.

In addition, the injection molding portions 150, 160, and 170 form an injection coupling portion 154 near the coupled surface 114 of the coupling portions 112, 122, and 132. Further, one side of the injection coupling portion 154 is formed in a shape corresponding to the coupled surface 114 by injecting the TPE between the protrusions 116 of the coupled surface 114 and is coupled with the coupling portions 112, 122, and 132.

Figure 4:
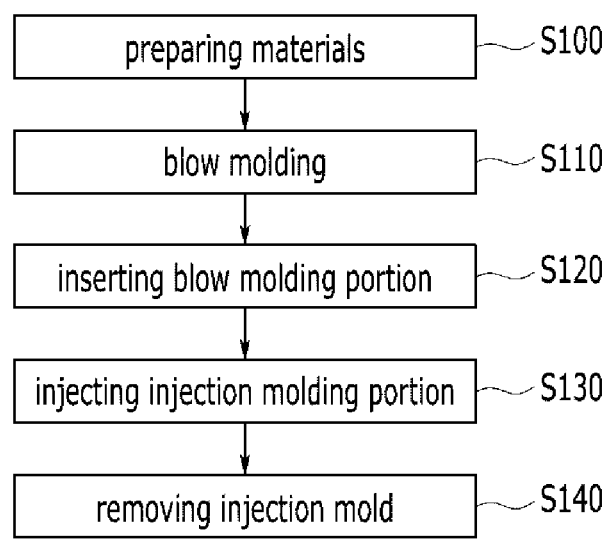
FIG. 4 is a flowchart of a method for producing an air intake hose for a vehicle according to an exemplary embodiment of the present invention.

FIG. 4 is a flowchart of a method for producing an air intake hose for a vehicle according to an exemplary embodiment of the present invention.

As shown in FIG. 4, materials are prepared for forming the blow molding portion 100 and the injection molding portions 150, 160, and 170 of the air intake hose 10 at a step S100, and the blow molding portion 100 is formed by blow molding at a step S110. Herein, the blow molding is a kind of molding in which hollow products are made by blowing air into materials after the materials are disposed in a mold. The blow molding is well-known to a person of ordinary skill in the art, so a detailed description thereof will be omitted.

The blow molding portion 100 is inserted into the injection space 208 through one end of injection mold 200 at a step S120 after the blow molding portion 100 is formed at the step S110. In addition, the coupling portions 112, 122, and 132 are inserted into the injection space 208 at the step S120.

The materials (TPE) of the injection molding portions 150, 160, and 170 are injected into the injection space 208 through the other end of the injection mold 200 at a step S130 after the blow molding portion 100 is inserted at the step S120. Herein, the injected material (TPE) forms the injection molding portions 150, 160, and 170 such that the coupling portions 112, 122, and 132 and the injection coupling portion 154 are coupled with each other at the step S130.

The injection mold 200 is separated from the air intake hose 10 at a step S140 after the injection molding portions 150, 160, and 170 and the blow molding portion 100 are coupled with each other by the injection molding of the TPE at the step S130. Thus, the production of the air intake hose 10 is completed by removing the injection mold 200.

According to an exemplary embodiment of the present invention, the coupling force of the injection molding portions 150, 160, and 170 and the blow molding portion 100 can be improved. In addition, aesthetical features can be improved since a clamp for coupling the injection molding portions 150, 160, and 170 and the blow molding portion 100 is eliminated. Further, the production process can be simplified and the production cost can be reduced since the injection molding portions 150, 160, and 170 and the blow molding portion 100 are integrally combined by the injection molding of the injection molding portions 150, 160, and 170.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An air intake hose for a vehicle comprising:
   a blow molding portion formed in a hollow hose shape by blow molding;
   an injection molding portion formed in a hollow hose shape by injection molding; and
   a coupling portion formed at one end of the blow molding portion,
   wherein the blow molding portion and the injection molding portion are coupled with each other by injecting a material forming the injection molding portion into an injection mold in a state in which the coupling portion is inserted in the injection mold;
   wherein a coupled surface is formed at an end of the coupling portion;
   wherein an injection coupling portion coupled with the coupled surface is formed at the injection molding portion;
   wherein a plurality of protrusions are protruded in an axial direction of coupling portion from the coupled surface;
   wherein one surface of the injection coupling portion coupled with the coupled surface is formed corresponding to a shape of the coupled surface; and
   wherein the protrusions are gradually widened in a circumferential direction of the coupling portion along a protruding direction.

2. The air intake hose of claim 1, wherein bellows are formed at a part of the injection molding portion along a length direction thereof.

3. The air intake hose of claim 1, wherein the injection molding portion is coupled with the blow molding portion so as to form an extended shape of the blow molding portion.

4. The air intake hose of claim 1, wherein the coupling portion is inserted into the injection molding portion such that an exterior circumference of the coupling portion contacts an interior circumference of the injection molding portion.

5. The air intake hose of claim 1, wherein materials of the blow molding portion and the injection molding portion are thermoplastics having the same polarity.

6. The air intake hose of claim 5, wherein the material of the blow molding portion is polypropylene.

7. The air intake hose of claim 5, wherein the material of the blow molding portion is nylon.

8. The air intake hose of claim 5, wherein the material of the injection molding portion is a thermoplastic elastomer.

9. The air intake hose of claim 1, wherein:
   the injection molding portion includes first, second, and third injection molding portions; and
   the blow molding portion includes first, second and third pipes,
   wherein the second and third pipes are bifurcated from the first pipe to form a Y shape, and
   wherein the first injection molding portion is coupled to an end of the first pipe, the second injection molding portion is coupled to an end of the second pipe, and the third injection molding portion is coupled to an end of the third pipe.

10. An air intake hose for a vehicle comprising:
    a blow molding portion formed in a hollow hose shape by blow molding;
    an injection molding portion formed in a hollow hose shape by injection molding; and
    a coupling portion formed at one end of the blow molding portion;
    wherein the blow molding portion and the injection molding portion are coupled with each other by injecting a material forming the injection molding portion into an injection mold in a state in which the coupling portion is inserted in the injection mold;
    wherein the injection molding portion includes first, second, and third injection molding portions;
    wherein the blow molding portion includes first, second and third pipes;
    wherein the second and third pipes are bifurcated from the first pipe to form a Y shape;
    wherein the first injection molding portion is coupled to an end of the first pipe, the second injection molding portion is coupled to an end of the second pipe, and the third injection molding portion is coupled to an end of the third pipe; and
    wherein first, second and third bellows are formed at a part of the first, second and third injection molding portion respectively.

* * * * *